(12) United States Patent
Kim et al.

(10) Patent No.: US 9,965,374 B2
(45) Date of Patent: May 8, 2018

(54) PROFILE GUIDED INDIRECT FUNCTION CALL CHECK FOR CONTROL FLOW INTEGRITY

(71) Applicant: QUALCOMM Incorporated, San Diego, CA (US)

(72) Inventors: Minjang Kim, San Jose, CA (US); Joel Galenson, Santa Clara, CA (US); Sudha Anil Kumar Gathala, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/248,803

(22) Filed: Aug. 26, 2016

(65) Prior Publication Data

US 2018/0060209 A1   Mar. 1, 2018

(51) Int. Cl.
*G06F 9/44*    (2018.01)
*G06F 11/36*   (2006.01)

(52) U.S. Cl.
CPC ................. *G06F 11/3604* (2013.01)

(58) Field of Classification Search
CPC .................................................. G06F 11/3604
USPC .................................................. 717/130–144
See application file for complete search history.

(56) References Cited

U.S. PATENT DOCUMENTS

| | | | | |
|---|---|---|---|---|
| 5,668,999 A * | 9/1997 | Gosling | ............... | G06F 9/44589 714/E11.209 |
| 5,732,273 A * | 3/1998 | Srivastava | .......... | G06F 11/3466 714/E11.2 |
| 6,263,491 B1 * | 7/2001 | Hunt | ....................... | G06F 9/465 714/E11.209 |
| 6,397,379 B1 * | 5/2002 | Yates, Jr. | ............ | G06F 9/45554 717/140 |
| 6,463,582 B1 * | 10/2002 | Lethin | ................. | G06F 9/45504 717/138 |

(Continued)

FOREIGN PATENT DOCUMENTS

WO   2014189510 A1   11/2014

OTHER PUBLICATIONS

Joao et al, "Improving the Performance of Object-Oriented Languages with Dynamic Predication of Indirect Jumps", ACM, pp. 80-90, 2008.*

(Continued)

*Primary Examiner* — Anil Khatri
(74) *Attorney, Agent, or Firm* — Jae-Hee Choi; The Marbury Law Group

(57) ABSTRACT

Embodiments include computing devices, apparatus, and methods implemented by the apparatus for implementing profile guided indirect jump checking on a computing device, including encountering an indirect jump location of implementing an indirect jump during execution of a program, identifying an indirect jump target of the indirect jump, determining whether the indirect jump location and the indirect jump target are associated in a profile guided indirect jump table, and determining whether the indirect jump location and the indirect jump target are associated in a compiler guided indirect jump table in response to determining that the indirect jump location and the indirect jump target are not associated in the profile guided indirect jump table.

30 Claims, 9 Drawing Sheets

(56) References Cited

U.S. PATENT DOCUMENTS

| | | | |
|---|---|---|---|
| 6,704,923 B1* | 3/2004 | Gosling | G06F 9/44589 714/E11.209 |
| 6,763,452 B1* | 7/2004 | Hohensee | G06F 9/45554 703/22 |
| 6,826,748 B1* | 11/2004 | Hohensee | G06F 9/45554 717/130 |
| 6,941,545 B1* | 9/2005 | Reese | G06F 9/45554 711/206 |
| 6,954,923 B1* | 10/2005 | Yates, Jr. | G06F 9/30174 712/208 |
| 7,013,456 B1* | 3/2006 | Van Dyke | G06F 9/45533 712/208 |
| 7,254,806 B1* | 8/2007 | Yates, Jr. | G06F 9/45554 712/227 |
| 7,493,630 B2* | 2/2009 | Hunt | G06F 9/443 717/130 |
| 7,734,895 B1* | 6/2010 | Agarwal | G06F 8/52 712/13 |
| 8,352,797 B2 | 1/2013 | Black et al. | |
| 8,424,082 B2 | 4/2013 | Chen et al. | |
| 8,434,064 B2 | 4/2013 | Akritidis et al. | |
| 8,732,674 B1* | 5/2014 | Agha | G06F 9/45516 717/130 |
| 9,329,846 B1* | 5/2016 | August | G06F 8/443 |
| 9,361,102 B2* | 6/2016 | Tan | G06F 9/30058 |
| 9,390,260 B2* | 7/2016 | Tan | G06F 8/427 |
| 2015/0007142 A1 | 1/2015 | Biffle et al. | |
| 2015/0135313 A1 | 5/2015 | Wesie et al. | |
| 2015/0370560 A1 | 12/2015 | Tan et al. | |
| 2016/0170769 A1 | 6/2016 | Lemay et al. | |
| 2016/0179546 A1 | 6/2016 | Yamada et al. | |

OTHER PUBLICATIONS

Jia et al, "SPIRE: Improving Dynamic Binary Translation through SPC-Indexed Indirect Branch Redirecting ", ACM, pp. 1-11, 2013.*

McCandless et al, "Compiler Techniques to Improve Dynamic Branch Prediction for Indirect Jump and Call Instructions", ACM Transactions on Architecture and Code Optimization, vol. 8, No. 4, Article 24, pp. 1-20, 2012.*

Federico et al, "A jump-target identification method for multi-architecture static binary translation", ACM, pp. 1-10, 2016.*

Ebeinglu, "A Compilation Technique for Software Pipelining of Loops With Conditional Jumps", ACM, pp. 69-79, 1987.*

International Search Report and Written Opinion—PCT/US2017/047111—ISA/EPO—dated Nov. 28, 2017.

* cited by examiner

FIG. 4

| Jump Location (402) | Jump Target (404) |
|---|---|
| A (406) | T3, T8, T12, T14 |
| ... (408) | ... |
| W | T1, T3, T4 |
| X (410) | T5 |
| Y (412) | T8, T9 |
| Z (414) | T10, T11 |

Table 400

FIG. 5A

| Jump Location (402) | Jump Target (404) | Confidence (504) |
|---|---|---|
| W (506) | T1, T2, T3, T4 | High |

500

| Jump Location | Jump Target | Confidence |
|---|---|---|
| X (508) | T5, T6 | Low |

502a

| Jump Location | Jump Target | Confidence |
|---|---|---|
| Y (510) | T7, T8, T9 | Low |

502b

| Jump Location | Jump Target | Confidence |
|---|---|---|
| Z (512) | T10, T11 | Low |

| Jump Location (402) | Jump Target (404) | Confidence (504) |
|---|---|---|
| W (506) | T1, T2, T3, T4 | High |

520

| Jump Location | Jump Target | Confidence |
|---|---|---|
| X (508) | T5, T6 | Low |
| Y (510) | T7, T8, T9 | Low |
| Z (512) | T10, T11 | Low |

| Jump Location (402) | Jump Target (404) | Confidence (504) |
|---|---|---|
| W (506) | T1, T2, T3, T4 | High |
| X (508) | T5, T6 | Low |
| Y (510) | T7, T8, T9 | Low |
| Z (512) | T10, T11 | Low |

524

PROFILE GUIDED INDIRECT FUNCTION CALL CHECK FOR CONTROL FLOW INTEGRITY

BACKGROUND

Control flow integrity aims to ensure the order in which individual statements, instructions, or function calls of a software program are executed or evaluated by a processor. A part of control flow integrity prevents calling of a modified pointer to indirect jump/branch targets, such as could occur from arbitrary modifications of function pointers, virtual function calls, and function returns. The prevention of arbitrary modification of indirect jump/branch targets uses static analysis (by a compiler or instrumentation) to build tables of the legitimate indirect jump/branch targets. At runtime, the tables are used to check whether an indirect jump/branch is to a valid target.

Such control flow integrity implementations have been shown to be insecure. To minimize runtime overhead, some runtime checks of the tables of the legitimate indirect jump/branch targets are removed or weakened. The control flow integrity also depends on static analysis to determine the legitimate jump/branch targets, which can result in incomplete identification of all legitimate jump/branch targets for a program. Thus, the tables are too coarse-grain, missing legitimate jump/branch targets and resulting in false negatives. The tables are also susceptible to attacks that swap pointers in the same table (e.g., pointers to read and write functions). A dynamic approach, such as cryptographic control flow integrity, can help address the susceptibility to attacks. However, such dynamic solutions incur much higher overhead, typically a 30% increase or a two times slow down in program execution.

SUMMARY

Various disclosed embodiments may include apparatuses and methods for implementing profile guided indirect jump checking on a computing device. Various embodiments may include identifying an indirect jump target of an indirect jump in response to encountering an indirect jump location while implementing the indirect jump during execution of a program. Some embodiments may include determining whether the indirect jump location and the indirect jump target are associated in a profile guided indirect jump table. Some embodiments may include determining whether the indirect jump location and the indirect jump target are associated in a compiler guided indirect jump table in response to determining that the indirect jump location and the indirect jump target are not associated in the profile guided indirect jump table.

Some embodiments may include continuing to execute the program in response to determining that the indirect jump location and the indirect jump target are associated in the profile guided indirect jump table.

Some embodiments may include continuing to execute the program with a warning in response to determining that the indirect jump location and the indirect jump target are associated in the compiler guided indirect jump table and aborting the program in response to determining that the indirect jump location and the indirect jump target are not associated in the compiler guided indirect jump table.

Some embodiments may include determining whether the indirect jump location is associated with a high confidence level in response to determining that the indirect jump location and the indirect jump target are not associated in the profile guided indirect jump table and aborting the program in response to determining that the indirect jump location is associated with a high confidence level.

In some embodiments, determining whether the indirect jump location and the indirect jump target are associated in a compiler guided indirect jump table may include determining whether the indirect jump location and the indirect jump target are associated in the compiler guided indirect jump table in response to determining that the indirect jump location is not associated with a high confidence level. Some embodiments may include continuing to execute the program with a warning in response to determining that the indirect jump location and the indirect jump target are associated in the compiler guided indirect jump table and aborting the program in response to determining that the indirect jump location and the indirect jump target are not associated in the compiler guided indirect jump table.

In some embodiments, determining whether the indirect jump location is associated with a high confidence level may include retrieving a confidence level associated with the indirect jump location in the profile guided indirect jump table.

In some embodiments, determining whether the indirect jump location is associated with a high confidence level may include identifying a confidence level designated for the profile guided indirect jump table.

In some embodiments, the profile guided indirect jump table is one of a plurality of indirect jump tables each containing less than all of the indirect jump locations for the program.

Various embodiments may include a computing device having a processing device configured for profile guided indirect jump checking. The processing device may be configured to perform operations of one or more of the embodiment methods summarized above.

Various embodiments may include a computing device having means for performing functions of one or more of the embodiment methods summarized above.

Various embodiments may include a non-transitory processor-readable storage medium having stored thereon processor-executable instructions configured to cause a processor of a computing device to perform operations of one or more of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 4 is a diagram illustrating an example compiler guided indirect jump table suitable for implementing various embodiments.

FIGS. 5A-5C are tables illustrating example profile guided indirect jump tables suitable for implementing various embodiments.

DETAILED DESCRIPTION

Figure 1:
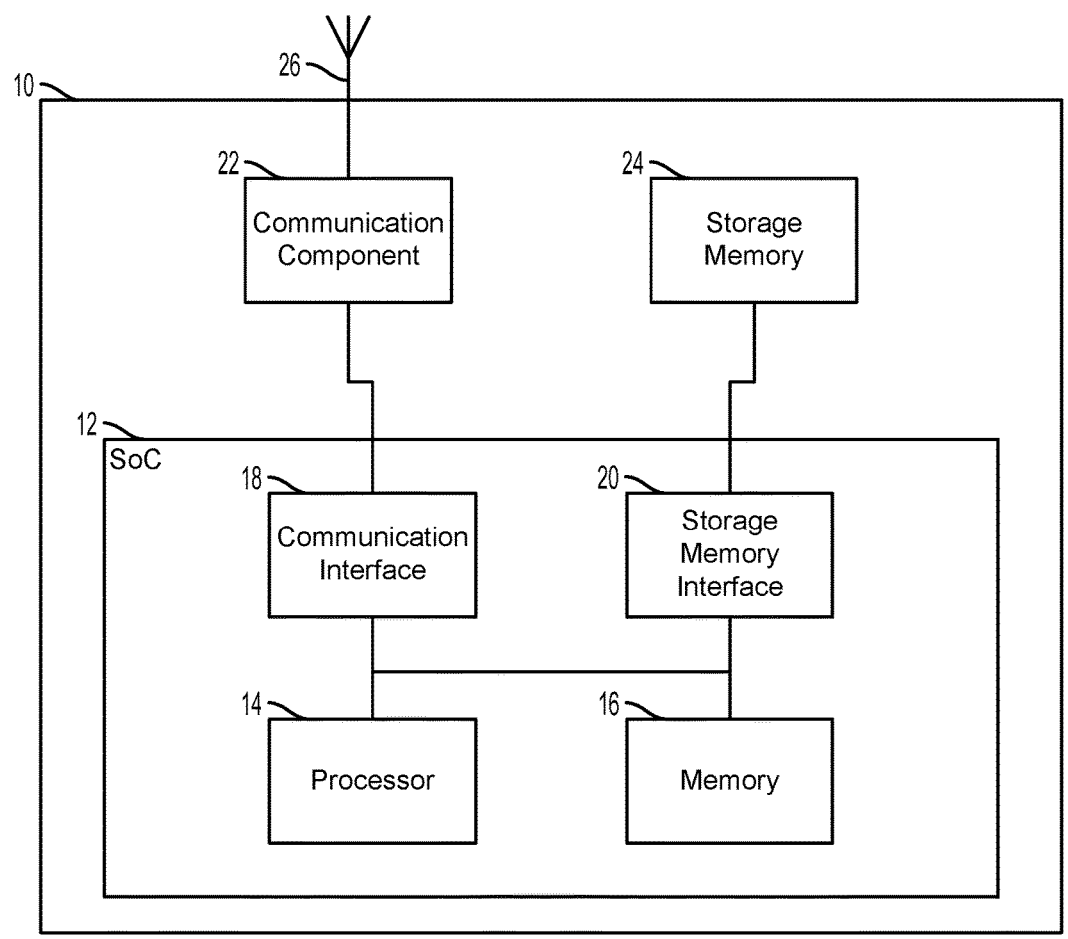
FIG. 1 is a component block diagram illustrating a computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and systems and devices implementing such methods for improving control flow integrity security using smaller, more fine-grain, and rated tables of legitimate indirect jump/branch targets (profile guided indirect jump tables) used for profile guided indirect function call checks. The apparatus and methods of the various embodiments may include using profile data to identify legitimate indirect jump/branch targets ("jump targets") for identified indirect jump/branch locations ("jump locations"), using statistical analysis to rate the tables for each indirect jump location, and determining from the profile guided indirect jump tables whether to execute or abort an application.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

The terms "jump" and "branch" refer to the control flow instructions that may direct execution of a program to an instruction at designated address, either directly using the designated address or indirectly using a reference to a location storing the designated address. For clarity and brevity of explanation, the terms "jump" and "branch" are used interchangeably herein. Use of one of the terms "jump" and "branch" in place of the other is nonlimiting as the disclosures herein may apply equally to both jump instructions and branch instructions.

Tables of legitimate indirect jump targets are generally large tables including the indirect jump locations associated with indirect jump targets for a program. Profiling data of offline analysis of a program may be used to generate multiple profile guided indirect jump tables of smaller size. For example, each profile guided indirect jump table may be created for as few as a single indirect jump location and its associated indirect jump targets. A profiler maybe implemented to collect indirect jump target traces and frequencies of the indirect jump target traces. The profiler may use this information to profile a program with representative training inputs. For example, for indirect jumps identified to occur at indirect jump location W, the indirect jump target traces may show 10,000 indirect jumps to target T1, 50 indirect jumps to target T2, 9,500 indirect jumps to target T3, and 10 indirect jumps to target T4. For the same program, for indirect jumps identified to occur at indirect jump location Y, the indirect jump target traces may show 1,500 indirect jumps to target T7, 1,450 indirect jumps to target T8, and 1,500 indirect jumps to target T9. The profiling of a program to collect the profiling data to build the profile guided indirect jump tables may be collected over numerous executions of the program.

Using the profiling data alone to build the profile guided indirect jump tables may result in too many false positives (i.e., an instruction thought to be illegal that actually is correct) if not all of the indirect jump targets for the indirect jump locations are identified. To reduce such false positives, statistical analysis of the profiling data for each indirect jump location may be done to assign a confidence level to the profile guided indirect jump tables including the profiling data for the different indirect jump locations. Statistical analysis of the profiling data for each indirect jump location may be used to identify whether an identified indirect jump target is more likely than other identified indirect jump targets using various metrics, whether multiple indirect jump targets are significant indirect jump targets, and/or whether a tail of the indirect jump targets is long. For profiling data of a first indirect jump location having a dominant indirect jump target and/or a short or no tail, a first profile guided indirect jump table for the first indirect jump location may be assigned a high level of confidence. For profiling data of a second indirect jump location having multiple significant indirect jump targets and/or a long tail, a second profile guided indirect jump table for the second indirect jump location may be assigned a low level of confidence. The high and low levels of confidence may indicate the likelihood of whether an indirect jump target from an indirect jump location is a legitimate indirect jump target relative to the metric used to determine the confidence levels. For example, the metric may be set such that a high level of confidence indicates that the likelihood of a legitimate indirect jump target is greater than a 50% chance, and a low level of confidence indicates that the likelihood of a legitimate indirect jump target is less than a 50% chance.

At runtime, the profile guided indirect jump tables may be used in conjunction with a coarse-grain, compiler guided indirect jump table (as described in the background) to determine whether an indirect jump target is legitimate. Upon encountering an indirect jump location in an executing program, a check of the profile guided indirect jump table for the indirect jump location may be executed to determine whether the indirect jump target for the indirect jump location is in the profile guided indirect jump table. In response to determining that the indirect jump target for the indirect jump location matches an indirect jump target in the profile guided indirect jump table for the indirect jump location, the processor may continue normal execution of the program, including the indirect jump. In response to determining that the indirect jump target for the indirect jump location does not match an indirect jump target in the profile guided indirect jump table for the indirect jump location, the processor may determine whether the profile guided indirect jump table is a high confidence (or low confidence) profile guided indirect jump table. In response to determining that the profile guided indirect jump table is a high confidence (or is not a low confidence) indirect jump table, the processor may abort execution of the program. In response to determining that the profile guided indirect jump table is not a high confidence (or is a low confidence) profile guided indirect jump table, the processor may execute a check of the compiler guided indirect jump table may to determine whether the indirect jump target for the indirect jump location is in the compiler guided indirect jump table. In response to determining that the indirect jump target for the indirect jump location is in the compiler guided indirect jump table, the processor may continue normal execution the program, including the indirect jump, though with a warning. In response to determining that that the indirect jump target for the indirect jump location is not in the compiler guided indirect jump table, the processor may abort execution of the program.

FIG. 1 illustrates a system including a computing device 10 suitable for use with the various embodiments. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various embodiments. The computing device 10 may not be limited to one of each of the components, and multiple instances of each component may be included in various configurations of the computing device 10.

Figure 2:
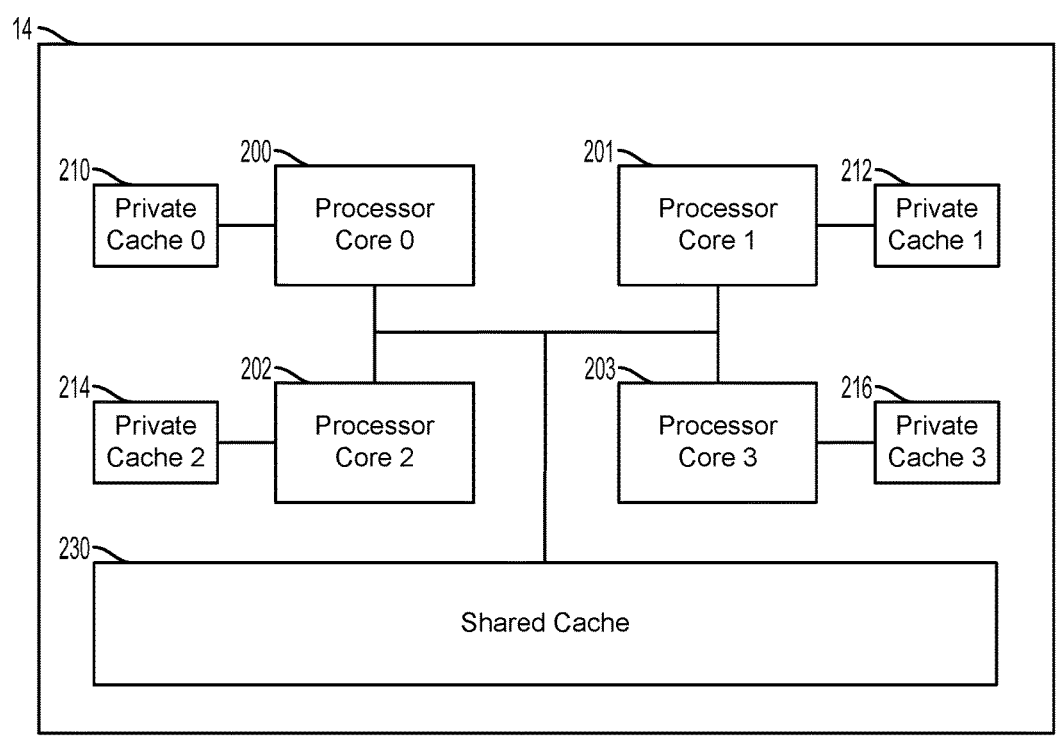
FIG. 2 is a component block diagram illustrating an example multicore processor suitable for implementing various embodiments.

FIG. 2 illustrates a multicore processor suitable for implementing an embodiment. The multicore processor 14 may include multiple processor types, including, for example, a central processing unit, a graphics processing unit, and/or a digital processing unit. The multicore processor 14 may also include a custom hardware accelerator which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a graphics processing unit or a digital signal processor, and the processor cores 200, 201, 202, 203 may be homogeneous graphics processor cores or digital signal processor cores, respectively. The multicore processor 14 may be a custom hardware accelerator with homogeneous processor cores 200, 201, 202, 203. For ease of reference, the terms "custom hardware accelerator," "processor," and "processor core" may be used interchangeably herein.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 12 of FIG. 1) may include any number of homogeneous or heterogeneous multicore processors 14. In various embodiments, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to for read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various embodiments to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein.

Figure 3:
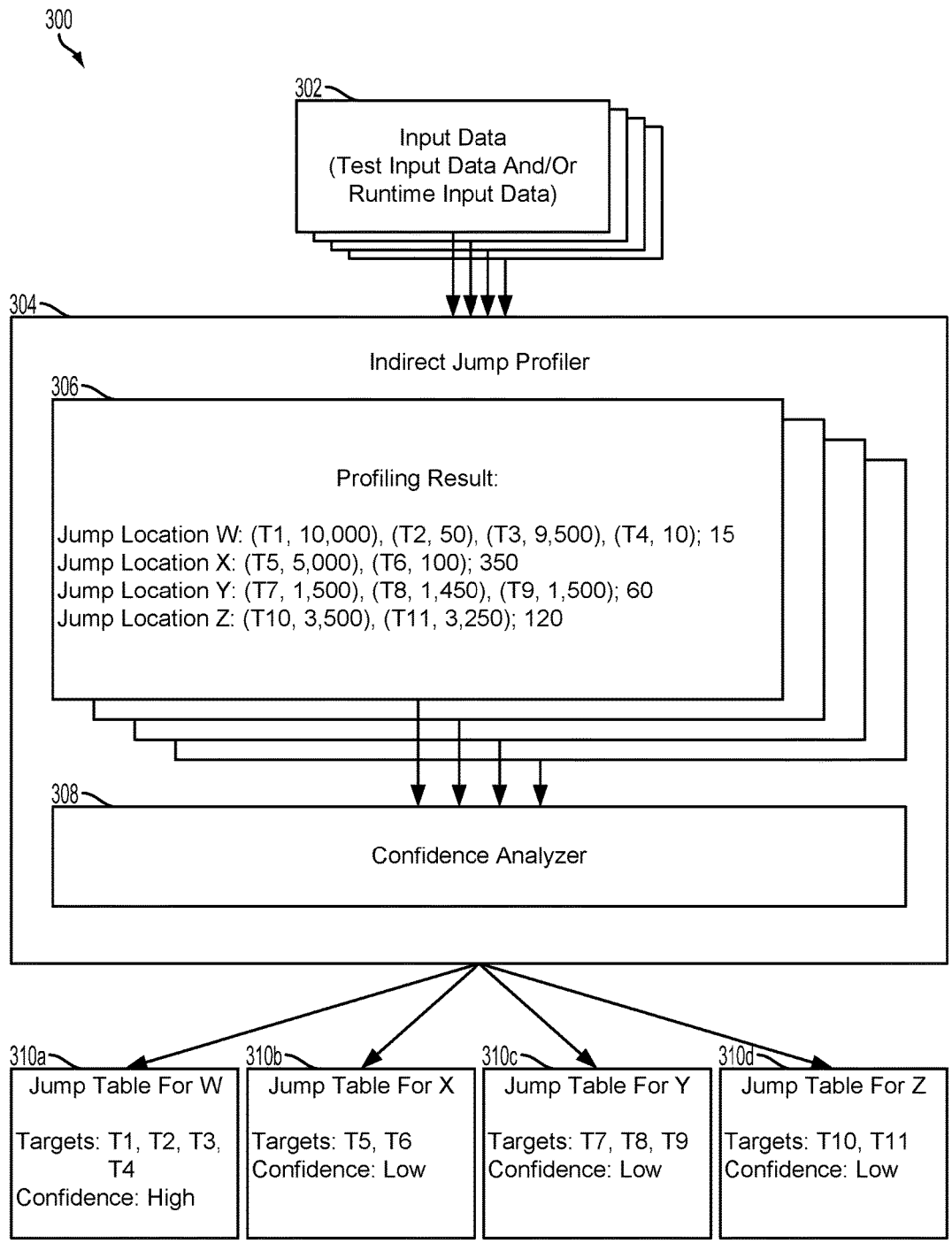
FIG. 3 is a block diagram illustrating an example indirect jump profiling system suitable for implementing various embodiments.

FIG. 3 illustrates an example embodiment of an indirect jump profiling system 300 configured to generate profile guided indirect jump tables 310*a*, 310*b*, 310*c*. The indirect jump profiling system 300 may provide input data 302 to an indirect jump profiler 304. The input data 302 may include data relating to traces of indirect jumps from indirect jump locations to indirect jump targets. The input data 302 may also include further trace data of the instructions executed at the indirect jump target and subsequent instructions executed as a result of the indirect jump, including types and/or numbers of instructions executed. The input data 302, including the trace data of the instructions executed, may indicate information regarding a tail of an indirect jump.

In various embodiments, the input data 302 may be gathered during multiple offline testing runs of a program, and provided to the indirect jump profiler 304 in various manners, including individually, in batches, and/or as a whole, either over time or at once. In various embodiments, the input data 302 may be gathered during runtime executions of the program on a computing device (e.g., computing device 10 in FIG. 1), and provided to the indirect jump profiler 304 at, during, and/or after execution of the program. In various embodiments, the input data 302 gathered during runtime executions of the program may be used to build a profile guided indirect jump table 310*a*, 310*b*, 310*c*, and/or to update a profile guided indirect jump tables 310*a*, 310*b*, 310*c* built using input data 302 gathered during offline program runs and/or during runtime program runs.

The indirect jump profiler 304 may analyze the input data 302 to generate profiling results 306 that may identify indirect jump targets associated with indirect jump locations and frequencies of the indirect jump targets for the indirect jump locations. The indirect jump profiler 304 may associate an indirect jump location with its indirect jump target(s) and the frequency of the occurrence of the indirect jump target(s).

The example illustrated in FIG. 3 includes four (4) indirect jump locations, W, X, Y, and Z. Each of the indirect jump locations may be associated with its indirect jump target(s) as identified by the indirect jump profiler 304 from the trace data of the input data 302. The example illustrated in FIG. 3 includes indirect jump location W associated with indirect jump targets T1, T2, T3, and T4; indirect jump location X associated with indirect jump targets T5 and T6; indirect jump location Y associated with indirect jump targets T7, T8, and T9; and indirect jump location Z associated with indirect jump targets T10 and T11.

Each of the indirect jump targets may be associated with its frequency as an indirect jump target of an associated indirect jump location as identified by the indirect jump profiler 304 from the trace data of the input data 302. The example illustrated in FIG. 3 includes indirect jump target T1 as an indirect jump target of indirect jump location W 10,000 times, indirect jump target T2 50 time, indirect target T3 9,500 times, and indirect target T4 10 times; indirect jump target T5 as an indirect jump target of indirect jump location X 4,000 times and indirect jump target T6 100 times; indirect jump target T7 as an indirect jump target of indirect jump location Y 1,500 times, indirect target T8 1,450 times, and indirect target T9 1,500 times; and indirect jump target T10 as an indirect jump target of indirect jump location Z 3,500 times and indirect target T11 3,250 times.

The indirect jump profiler 304 may also analyze the input data 302 to generate profiling results 306 that may identify lengths of tails of indirect jump targets associated with indirect jump locations. Each and/or the longest length of a tail of an indirect jump target associated with an indirect jump location may be associated with the indirect jump location as identified by the indirect jump profiler 304 from the trace data of the input data 302. The example illustrated in FIG. 3 includes the length of the longest tail associated with and indirect jump target associated with an indirect jump locations. The example illustrated in FIG. 3 includes a longest tail of an indirect jump associated with indirect jump location W with a length of 15 instructions, a longest tail with a length of 350 instructions associated with indirect jump location X; a longest tail with a length of 60 instructions associated with indirect jump location Y; and a longest tail with a length of 120 instructions associated with indirect jump location Z.

The indirect jump profiler 304 may include a confidence analyzer 308 capable of analyzing the profiling results 306 for assigning a confidence level for an indirect jump target associated with an indirect jump location. In various embodiments, the confidence analyzer 308 may use various forms of mathematical analysis to determine whether profiling results 306 result in high or low confidence levels for an indirect jump target associated with an indirect jump location. The confidence analyzer 308 may determine a confidence level for individual pairings of an indirect jump target associated with an indirect jump location, and/or groups of pairings of multiple indirect jump targets associated with an indirect jump location. The confidence levels may be determined for the pairings based on individual analysis of the profiling results 306 for each pairing, and/or based on analysis of the profiling results 306 in relation to the profiling results 306 of other pairings for the same and/or other indirect jump locations. The confidence analyzer 308 may analyze the frequency of the indirect jump target(s) associated with the indirect jump location(s) to determine a confidence level. For example, the confidence analyzer 308 may use absolute and/or relative thresholds and/or ratios, such as comparing a frequency value of a pairing against an absolute frequency value and/or a relative frequency value of an average and/or total frequency value of multiple pairings. In another example, the confidence analyzer 308 may use probabilities, such as likelihood of a pairing occurring with respect to another pairing(s). In another example, the confidence analyzer 308 may use predefined rules relating to the number of pairings and their frequencies in relation to each other.

In general, the confidence analyzer 308 may assign a high confidence level for pairings of an indirect jump location and at least one indirect jump target, in response to the analysis of profiling results 306 determining that a minority of pairings for the indirect jump location is more likely to occur than a majority of pairings by at least a certain measure. Similarly, the determination may be that the majority of pairings for the indirect jump location is less likely to occur than the minority of pairings by at least a certain measure. Conversely, the confidence analyzer 308 may assign a low confidence level for pairings of an indirect jump location and at least one indirect jump target, in response to the analysis of profiling results 306 determining that the majority of pairings for the indirect jump location is more likely to occur than the minority of pairings by at least a certain measure. Similarly, the determination may be that the minority of pairings for the indirect jump location is less likely to occur than the majority of pairings by at least a certain measure. In these examples, majority and minority may also be replaced by equal numbers. Whether a majority/minority or equal numbers are used, and the relative sizes of the majority and minority, may depend on a total number of pairings of indirect jump targets and an indirect jump location. For example, a small number of pairings may use equal numbers or near equal numbers for the relative sizes of the majority and minority. As the number of pairings increases the difference between the relative sizes of the majority and minority may become more pronounced.

In the example illustrated in FIG. 3, the indirect jump targets associated with indirect jump location W may be assigned a high confidence level because the frequency of a small number of indirect jump targets indicates a greater likelihood of those indirect jump targets occurring than the rest of the indirect jump targets. The frequency of indirect jump target T1 is illustrated as 10,000 times and the frequency of indirect jump target T3 is illustrated as 9,500 times, while the frequency of indirect jump target T2 is illustrated as 50 times and the frequency of indirect jump target T4 is illustrated as 10 times. The likelihood of indirect jump target T1 and indirect jump target T3 is greater by a certain measure than the likelihood of indirect jump target T2 and indirect jump target T4. The indirect jump targets associated with indirect jump location X may be assigned a high confidence level for similar reasons.

In the example illustrated in FIG. 3, the indirect jump targets associated with indirect jump location Y may be assigned a low confidence level because the frequency of a majority of the number of indirect jump targets indicates greater likelihood of those indirect jump targets occurring than the rest of the indirect jump targets. The frequency of indirect jump target T7 is illustrated as 1,500 times, the frequency of indirect jump target T8 is illustrated as 1,450 times, and the frequency of indirect jump target T9 is illustrated as 1,500 times. The likelihood of any of or a minority of the indirect jump targets T7, T8, and T9 having a greater likelihood of occurring than another of or a majority of the indirect jump targets T7, T8, and T9 is not greater by a certain measure. The indirect jump targets associated with indirect jump location Z may be assigned a low confidence level for similar reasons.

In various embodiments, the confidence analyzer 308 may also use a length of a tail of at least one of the indirect jump targets associated with an indirect jump location in determining whether to assign a high or low confidence level. The confidence analyzer 308 may analyze the number of instruction executions following each indirect jump targets associated with an indirect jump location to determine a confidence level. Based on analysis of the profiling results 306 for each pairing of the indirect jump targets associated with the indirect jump location, the confidence analyzer 308 may determine whether any of the pairings has a long tail.

Determination of a long tail may be based on a comparison of the number of execution instructions to various absolute and/or relative metrics, including predetermined values or thresholds, calculated values, average values, total values, ratio values, and percentage values. A number of execution instructions following an indirect jump exceeding a designated metric may be determined to be a long tail for the indirect jump target associated with the indirect jump location.

In the example illustrated in FIG. 3, the indirect jump targets associated with indirect jump location X may be assigned a low confidence level based on having a long tail regardless of the high confidence level that could have been assigned based on indirect jump target T5 being more likely to occur by a certain measure than indirect jump target T6. The longest tail of either indirect jump target T5 or indirect jump target T6 when associated with indirect jump location X is illustrated as 350 instructions. The metric for designating a tail as long may be such that 350 instructions is a long tail. The confidence analyzer 308 may assign a low confidence level to the indirect jump targets associated with indirect jump location X based on the determination of a long tail for the indirect jump targets when associated with indirect jump location X. The indirect jump targets associated with indirect jump location Z may be assigned a low confidence level for similar reasons.

Conversely, in the example illustrated in FIG. 3, the longest tail for the indirect jump targets associated with indirect jump location W is 15 instructions, and the longest tail for the indirect jump targets associated with indirect jump location Y may be 60 instructions. In either of these examples, the metric for designating a tail as long may be such that 15 or 60 instructions is not a long tail (or is a short tail). As a result the confidence level assigned based on analysis of the frequency of the indirect jump target(s) associated with the indirect jump locations may remain.

The indirect jump profiler 304 may generate indirect jump tables 310a, 310b, 310c. The indirect jump tables 310a, 310b, 310c may be generated in various forms, as discussed further herein with reference to FIGS. 5A-5C. The indirect jump tables 310a, 310b, 310c may indicate an association of an indirect jump location and at least one indirect jump target with a confidence level for the associated indirect jump targets. In the example illustrated in FIG. 3, an indirect jump table 310a, 310b, 310c may be generated of each of the indirect jump locations W (indirect jump table 310a), X (indirect jump table 310b), Y (indirect jump table 310c), and Z (indirect jump table 310d). Corresponding to the profiling results 306, the indirect jump table 310a may indicate an association between the indirect jump location W and the indirect target locations T1, T2, T3, and T4; the indirect jump table 310b may indicate an association between the indirect jump location X and the indirect target locations T5 and T6; the indirect jump table 310c may indicate an association between the indirect jump location Y and the indirect target locations T7, T8, and T9; and the indirect jump table 310d may indicate an association between the indirect jump location Z and the indirect target locations T10 and T11. Corresponding to the profiling results 306 analyses by the confidence analyzer 308, the indirect jump table 310a may indicate a high confidence level, and the indirect jump tables 310b, 310c, 310d may indicate a low confidence level.

FIG. 4 illustrates an example embodiment of a compiler guided indirect jump table 400. At compile time, a compiler (not shown) executed by a processor (e.g., processor 14 in FIGS. 1 and 2) may analyze a program code and generate compiler guided indirect jump table 400. The compiler guided indirect jump table 400 may include a column for indirect jump locations 402 and a column for indirect jump targets 404. Each row (or entry) 406, 408, 410, 412, 414 of the compiler guided indirect jump table 400 may indicate an association of an indirect jump location and at least one indirect jump target. The compiler guided indirect jump table 400 may include as many rows 406, 408, 410, 412, 414 as indirect jump locations identified during compiling the program code. The compiler may not identify all of the indirect jump targets for an indirect jump locations, for example, because some of the indirect jump targets may be variable based on conditions during execution of the program code.

FIGS. 5A-5C illustrate examples of profile guided indirect jump tables 500, 502a, 502b, 502c, 520, 522, 524 (e.g., profile guided indirect jump tables 310a, 310b, 310c, 310d in FIG. 3) suitable for use with various embodiments. These example tables continue from the example illustrated in FIG. 3, including the profiling data (e.g., profiling data 306 in FIG. 3) and the confidence levels.

The profile guided indirect jump tables 500, 502a, 502b, 502c, 520, 522, 524 may include a column for indirect jump locations 402 and a column for indirect jump targets 404. Each row (or entry) 506, 508, 510, 512 of the profile guided indirect jump tables 500, 502a, 502b, 502c, 520, 522, 524 may indicate an association of an indirect jump location and at least one indirect jump target. The row 506 may indicate the associations of indirect jump location W with the jump targets T1, T2, T3, and T4. The row 508 may indicate the associations of indirect jump location X with the jump targets T5 and T6. The row 510 may indicate the associations of indirect jump location Y with the jump targets T7, T8, and T9. The row 512 may indicate the associations of indirect jump location X with the jump targets T10 and T11.

In various embodiments, a confidence level may be assigned to a profile guided indirect jump table 500, 502a, 502b, 502c, 520, 522, such that each of the indirect jump locations in the profile guided indirect jump table 500, 502a, 502b, 502c, 520, 522 has the same confidence level. The confidence level of each profile guided indirect jump table 500, 502a, 502b, 502c, 520, 522 may be identified by metadata or by a storage location designated for profile guided indirect jump tables 500, 502a, 502b, 502c, 520, 522 having a designated confidence level. In various embodiments, the profile guided indirect jump tables 500, 502a, 502b, 502c, 520, 522, 524 may include a column for confidence levels 504. In various embodiments including the column for confidence levels 504, the rows 506, 508, 510, 512 may further indicate an association of a confidence level for an indirect jump location.

FIG. 5A illustrates example embodiments of profile guided indirect jump tables 500, 502a, 502b, 502c each dedicated for a single indirect jump location. In the example illustrated in FIG. 5A, the profile guided indirect jump table 500 may be dedicated to indirect jump location W. In various embodiments, the profile guided indirect jump table 500 may be designated as having a high confidence level. In various embodiments, the profile guided indirect jump table 500 may include the column for confidence levels 504 indicating a high confidence level. Similarly, the profile guided indirect jump tables 502a, 502b, 502c may be dedicated to indirect jump locations X, Y, and Z, respectively. In various embodiments, the profile guided indirect jump tables 502a, 502b, 502c may be designated as having a low confidence level. In various embodiments, the profile guided indirect jump tables 502a, 502b, 502c may include the column for confidence levels 504 indicating a low confidence level.

FIG. 5B illustrates example embodiments of profile guided indirect jump tables 520, 522. The profile guided indirect jump tables 520, 522 may dedicated for a single confidence level. In the example illustrated in FIG. 5B, the profile guided indirect jump table 520 may be dedicated to indirect jump locations with high confidence levels. In various embodiments, the profile guided indirect jump table 520 may be designated as having a high confidence level. In various embodiments, the profile guided indirect jump table 520 may include the column for confidence levels 504 indicating a high confidence level for each row 506 in the profile guided indirect jump table 520. In the example illustrated in FIG. 5B the profile guided indirect jump table 520 may include the row 506 for high confidence indirect jump location W. Similarly, the profile guided indirect jump table 522 may be dedicated to indirect jump locations with high confidence levels. In various embodiments, the profile guided indirect jump table 522 may be designated as having a low confidence level. In various embodiments, the profile guided indirect jump table 522 may include the column for confidence levels 504 indicating a low confidence level for each row 508, 510, 512 in the profile guided indirect jump table 522. In the example illustrated in FIG. 5B the profile guided indirect jump table 522 may include the rows 508, 510, 512 for low confidence indirect jump locations X, Y, and Z.

FIG. 5C illustrates an example embodiment of a profile guided indirect jump table 524. The profile guided indirect jump tables 524 may include some or all indirect jump profiler (e.g., indirect jump profiler 304 in FIG. 3) analyzed indirect jump locations for a program. In the example illustrated in FIG. 5C, the profile guided indirect jump table 524 may include the column for confidence levels 504 indicating a high or low confidence level for each row 506, 508, 510, 512 in the profile guided indirect jump table 524. In the example illustrated in FIG. 5C the profile guided indirect jump table 524 may indicate a high confidence level for indirect jump location W in the row 506, and may indicate a low confidence level for indirect jump locations X in the row 508, Y in the row 510, and Z in the row 512.

As noted herein, the examples illustrated in FIGS. 5A-5C continue the example illustrated in FIG. 3. FIGS. 3, 5A-5C illustrate non-limiting examples of profile guided indirect jump tables. The examples illustrated and described herein, particularly with reference to those of and relating to FIGS. 3, 5A-5C, are non-limiting. The profiling results may include any number of indirect jump locations associated with any number of indirect jump targets. The indirect jump targets may be associated with more than one indirect jump location. The frequencies, tail lengths, and certain measures and metrics for determining confidence levels may also be any number. The profile guided indirect jump tables and their rows may vary for various programs. An indirect jump profiling system (e.g., indirect jump profiling system 300 in FIG. 3) may generate any combination of profile guided indirect jump tables, such as any combination of the types of profile guided indirect jump tables in the examples illustrated in FIGS. 5A-5C.

Figure 6:
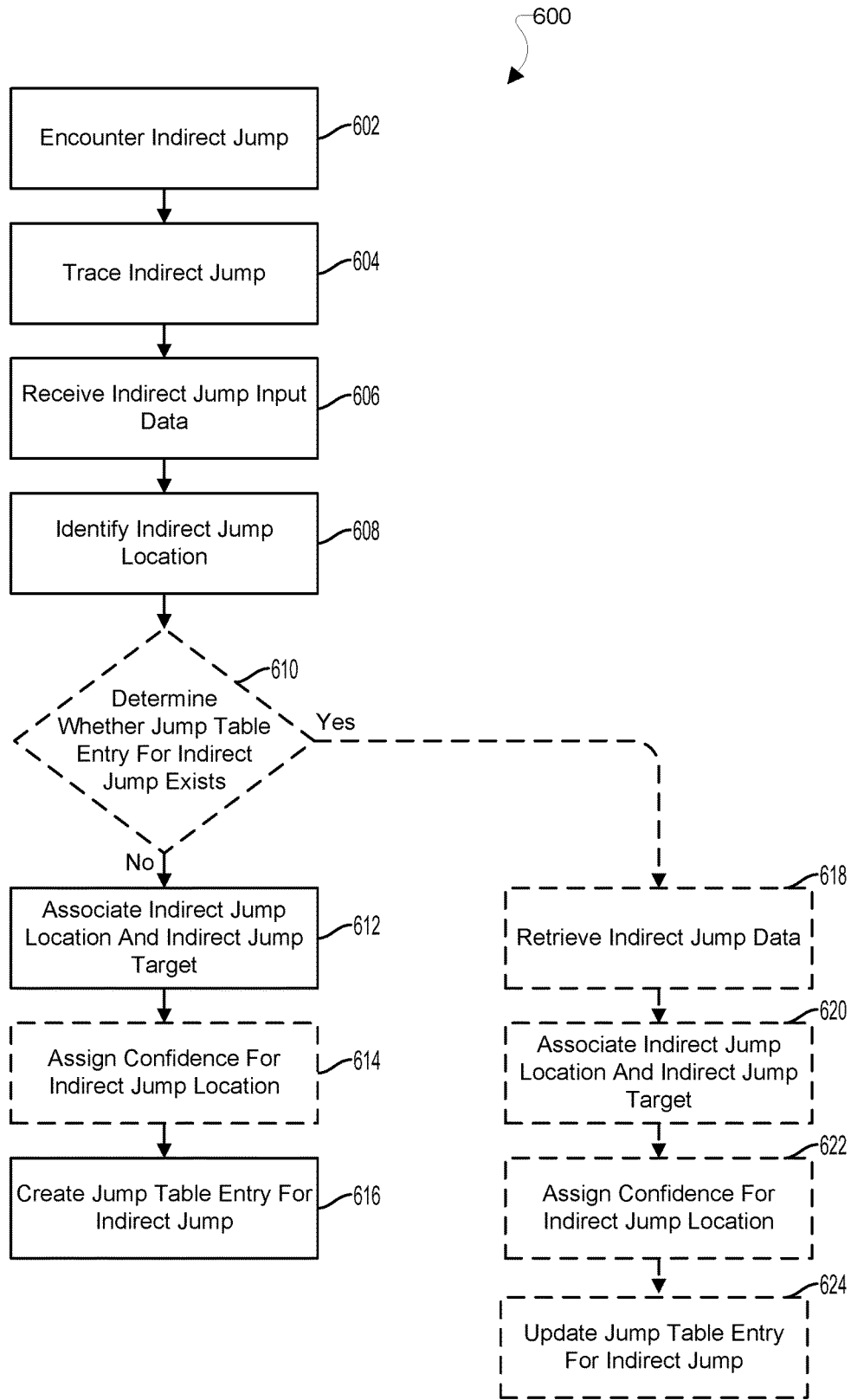
FIG. 6 is a process flow diagram illustrating a method for implementing indirect jump profiling according to various embodiments.

FIG. 6 illustrates a method 600 for implementing indirect jump profiling according to an embodiment. The method 600 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within an indirect jump profiling system (e.g., indirect jump profiling system 300 in FIG. 3) that includes other individual components. In order to encompass the alternative configurations enabled in the various embodiments, the hardware implementing the method 600 is referred to herein as a "processing device."

In block 602, the processing device may encounter an indirect jump in an executing program.

In block 604, the processing device may trace the execution of the indirect jump to an indirect jump target. In some embodiments, the processing device may continue to trace the execution beyond the indirect jump target and trace the execution of subsequent program instructions.

In block 606, the processing device may receive indirect jump input data. The indirect jump input data may include indirect jump input data gathered during multiple offline program runs and/or during a runtime program run, and may be received as individual data of a single program run, in batches of multiple program runs, and/or in a group of all of the program runs. The indirect jump input data may include data from the program trace, including indirect jump locations, indirect jump targets, and executed instructions following the indirect jump targets.

In block 608, the processing device may identify an indirect jump location. The processing device may select at least one indirect jump location from the indirect jump input data.

In determination block 610, the processing device may determine whether an entry exists for the indirect jump location in a profile guided indirect jump table. The processing device may search various existing profile guided indirect jump tables to determine whether any entry may be found in any of the profile guided indirect jump tables. In various embodiments, determination block 610 may be optionally implemented for updating existing profile guided indirect jump tables. In various embodiments, determination block 610 may be optionally implemented for offline and/or runtime runs of the program.

Following identification of the indirect jump location in block 608; or in response to determining that an entry does not exists for the indirect jump location in a profile guided indirect jump table (i.e., determination block 610="No"), the processing device may associate the indirect jump target for the selected indirect jump location and indirect jump target in block 612. The processing device may identify which indirect jump targets to associate with an indirect jump location from the trace data of the indirect jump input data showing the instructions at the indirect jump location executed after the indirect jump from the indirect jump location.

Figure 7:
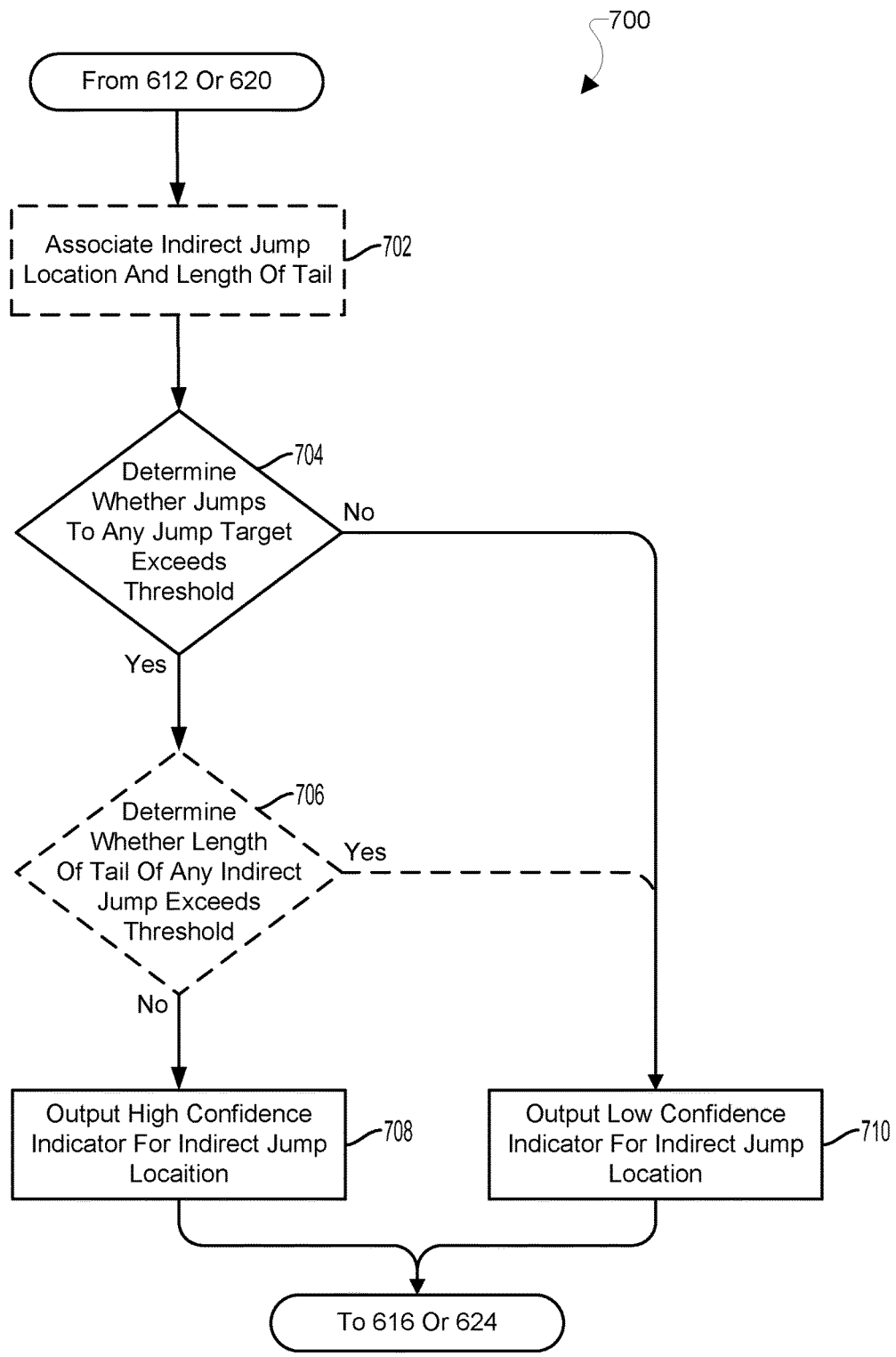
FIG. 7 is a process flow diagram illustrating a method for implementing indirect jump profiling according to various embodiments.

In block, 614, the processing device may assign a confidence level for the indirect jump location, as described further herein with reference to FIGS. 3 and 7. Assigning a confidence level may be optionally implemented for an indirect jump profiling system and/or processing device using confidence levels.

In block 616, the processing device may create a profile guided indirect jump table and/or profile guided indirect jump table entry for the indirect jump location. The creation of the profile guided indirect jump table and/or profile guided indirect jump table entry may include using the associated indirect jump location and the indirect jump target. In various embodiments, the profile guided indirect jump table may be created in a manner designating the profile guided indirect jump table with a confidence level associated with the indirect jump location. In various embodiments, the entry created in a profile guided indirect jump table may include a confidence level associated with the indirect jump location. In various embodiments, the entry created in a profile guided indirect jump table may be created in a table designated with a confidence level associated with the indirect jump location. In various embodiments, creating a profile guided indirect jump table may include creating an entry in the profile guided indirect jump table.

Each of blocks 618-620 may be optional, as determination block 610, for updating existing profile guided indirect jump tables. In response to determining that an entry does exists for the indirect jump location in a profile guided indirect jump table (i.e., determination block 610="Yes"), the processing device may retrieve indirect jump data for the selected indirect jump location in block 618. In various embodiments, retrieving indirect jump data for the selected indirect jump location may include stored indirect jump input data for the selected indirect jump location from pervious offline and/or runtime runs of the program. The indirect jump data may be retrieved from a memory (e.g., memory 16, 24 in FIG. 1).

In block 620, the processing device may associate the indirect jump target for the selected indirect jump location and indirect jump target in a manner similar to block 612.

In block, 622, the processing device may assign a confidence level for the indirect jump location, as described further herein with reference to FIGS. 3 and 7. Assigning a confidence level may be optionally implemented for an indirect jump profiling system and/or processing device using confidence levels.

In block 624, the processing device may update a profile guided indirect jump table and/or profile guided indirect jump table entry for the indirect jump location. Updating a profile guided indirect jump table and/or profile guided indirect jump table entry may include editing the information of an entry in a profile guided indirect jump table, including associations of the indirect jump location with an indirect jump target and/or a confidence level. In various embodiments, updating a profile guided indirect jump table and/or profile guided indirect jump table entry may include editing the information of an entry in a profile guided indirect jump table may include deleting and/or adding an entry to at least one profile guided indirect jump table. In various embodiments, updating a profile guided indirect jump table may include editing a designation of a confidence level for the profile guided indirect jump table.

In various embodiments, blocks 608-622 may be repeated and/or various implementations of the blocks may be run in parallel to profile and create profile guided indirect jump tables for all of the indirect jump input data.

FIG. 7 illustrates a method 700 for implementing indirect jump profiling according to an embodiment. The method 700 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within an indirect jump profiling system (e.g., indirect jump profiling system 300 in FIG. 3) that includes other individual components. In order to encompass the alternative configurations enabled in the various embodiments, the hardware implementing the method 600 is referred to herein as a "processing device." In various embodiments, the method 700 may include operations of blocks 614, 622 of the method 600.

In block 702, the processing device may associate the selected indirect jump location and a length of a tail following an indirect jump to an indirect jump target. The processing device may determine the length of the tail from the trace data of the indirect jump input data showing the instructions executed after the indirect jump from the indirect jump location to the indirect jump target. Associating a length of a tail with an indirect jump location may be optionally implemented for an indirect jump profiling system and/or processing device using length of a tail for assigning confidence levels.

In determination block 704, the processing device may determine whether a frequency of an indirect jump from an indirect jump location to an indirect jump target exceeds a threshold. As discussed herein with reference to FIG. 3, the threshold may be expressed in a variety of forms, including a threshold of at least one indirect jump target relative to other indirect jump targets. In various embodiments, further comparisons may be made to determine whether a certain number of indirect jump targets exceed the threshold and/or a comparison of the number of indirect jump targets that exceed the threshold to a number of indirect jump targets that do not exceed the threshold.

In response to determining that a frequency of an indirect jump from an indirect jump location to an indirect jump target exceeds a threshold (i.e., determination block 704="Yes"), the processing device may determine whether a length of a tail of any indirect jump from an indirect jump location to an indirect jump target exceeds a threshold in determination block 706. As discussed herein with reference to FIG. 3, the threshold may be expressed in a variety of forms. Determining whether a length of a tail exceeds a threshold may be optionally implemented for an indirect jump profiling system and/or processing device using length of a tail for assigning confidence levels.

In response to determining that a frequency of an indirect jump from an indirect jump location to an indirect jump target exceeds a threshold (i.e., determination block 704="Yes"), or in response to determining that a length of a tail of any indirect jump from an indirect jump location to an indirect jump target does not exceed a threshold (i.e., determination block 706="No"), the processing device may output a high confidence indicator for the indirect jump location in block 708.

In response to determining that a frequency of an indirect jump from an indirect jump location to an indirect jump target does not exceeds a threshold (i.e., determination block 704="No"), or in response to determining that a length of a tail of any indirect jump from an indirect jump location to an indirect jump target exceed a threshold (i.e., determination block 706="Yes"), the processing device may output a low confidence indicator for the indirect jump location in block 710.

The processor may then continue with the operations in blocks 616 or 624 of the method 600 as described with reference to FIG. 6.

Figure 8:
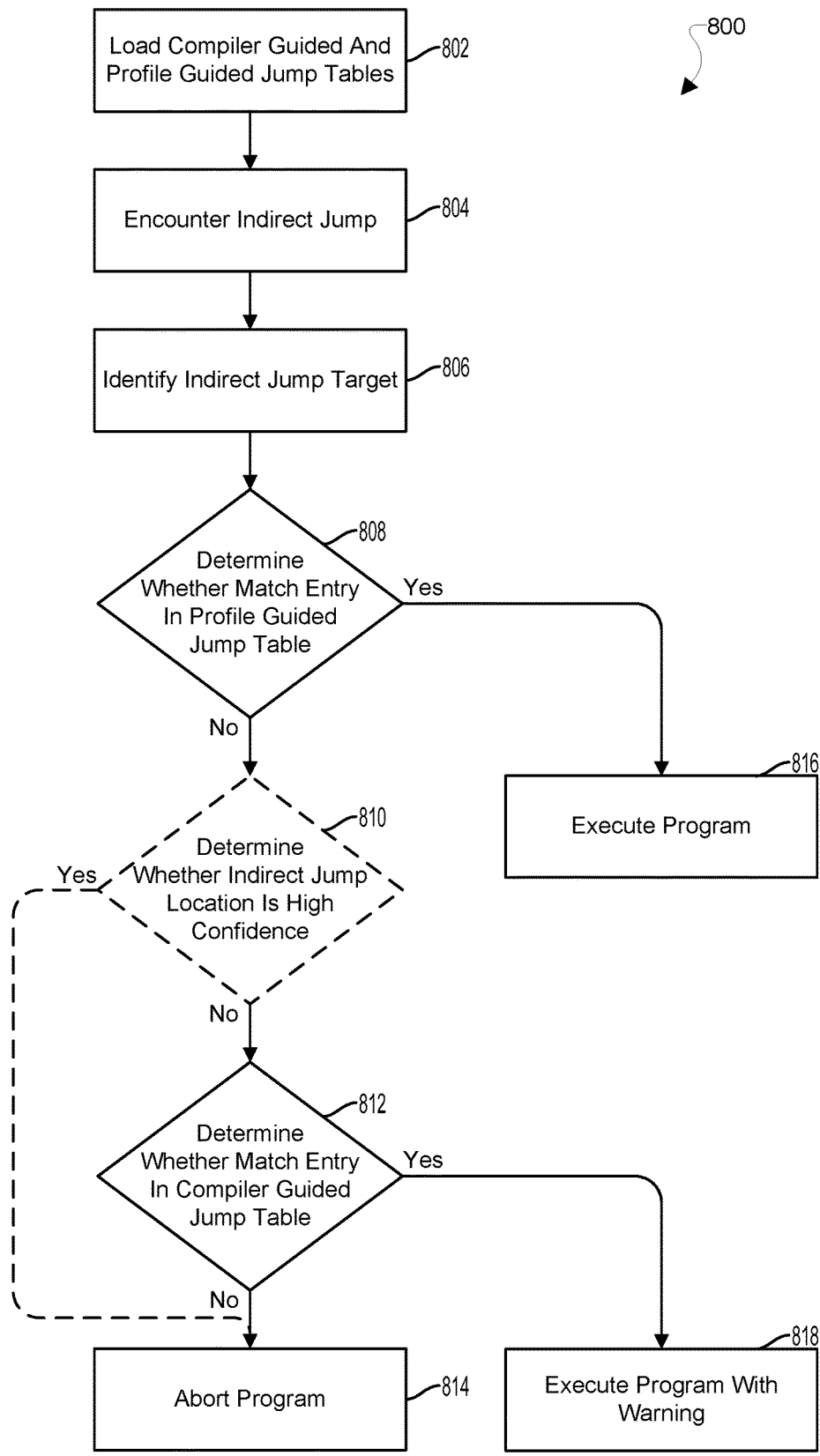
FIG. 8 is a process flow diagram illustrating a method for implementing profile guided indirect jump checking according to an embodiment.

FIG. 8 illustrates a method 800 for implementing profile guided indirect jump checking according to an embodiment. The method 800 may be implemented in a computing device in software executing in a processor (e.g., the processor 14 in FIGS. 1 and 2), in general purpose hardware, in dedicated hardware, or in a combination of a software-configured processor and dedicated hardware, such as a processor executing software within an indirect jump profiling system (e.g., indirect jump profiling system 300 in FIG. 3) that includes other individual components. In order to encompass the alternative configurations enabled in the various embodiments, the hardware implementing the method 800 is referred to herein as a "processing device."

In block 802, the processing device may load a compiler guided indirect jump table. As discussed herein, the compiler guided indirect jump table may be generated by a compiler run by a processing device for a program code. The compiler may identify the indirect jump locations and associated indirect jump targets available in the program code. But, the compiler may not be able to identify all of the indirect jump locations and associated indirect jump targets that may result from execution of the code as some of the indirect jump targets may be variable based on inputs to and execution of the program at runtime.

In block 804, the processing device may encounter an indirect jump location during runtime of the program. In block 806, the processing device may identify an indirect jump target of the encountered indirect jump location.

In determination block 808, the processing device may determine whether the encountered indirect jump location and the identified indirect jump target match an associated indirect jump location and indirect jump target in a profile guided indirect jump table. The processing device may locate a profile guided indirect jump table and entry having the encountered indirect jump location, and compare the identified indirect jump target with the associated indirect jump targets in the profile guided indirect jump table.

In response to determining that the encountered indirect jump location and the identified indirect jump target match an associated indirect jump location and indirect jump target in a profile guided indirect jump table (i.e., determination block 808="Yes"), the processing device may continue execution of the program in block 816.

In response to determining that the encountered indirect jump location and the identified indirect jump target does not match an associated indirect jump location and indirect jump target in a profile guided indirect jump table (i.e., determination block 808="No"), the processing device may determine whether the encountered indirect jump location is associated with a high confidence level in determination block 810. In various embodiments, the processing device may retrieve data indicating the confidence level associated with the encountered indirect jump location from the entry for the encountered indirect jump location in the profile guided indirect jump table. In various embodiments, the processing device may identify a designated confidence level of the profile guided indirect jump table having the entry for the encountered indirect jump. Determining whether the encountered indirect jump location is associated with a high confidence level may be optionally implemented for an indirect jump profiling system and/or processing device using confidence levels in checking indirect function calls.

In response to determining that the encountered indirect jump location is not associated with a high confidence level (i.e., determination block 810="No"), or in response to determining that the encountered indirect jump location and the identified indirect jump target does not match an associated indirect jump location and indirect jump target in a profile guided indirect jump table (i.e., determination block 808="No") when determination block 810 is not performed, the processing device may determine whether the encountered indirect jump location and the identified indirect jump target match an associated indirect jump location and indirect jump target in the compiler guided indirect jump table in determination block 812. The processing device may locate an entry in the compiler guided indirect jump table having the encountered indirect jump location, and compare the identified indirect jump target with the associated indirect jump targets in the compiler guided indirect jump table.

In response to determining that the encountered indirect jump location and the identified indirect jump target match an associated indirect jump location and indirect jump target in the compiler guided indirect jump table (i.e., determination block 812="Yes"), the processing device may continue execution of the program with a warning in block 818. In various embodiments, the warning may take various forms, including any combination of an audible, visible, and/or tactile warning to a user of a computing device running the program, a warning recorded in a log file stored locally on and/or remotely from the computing device running the program.

In response to determining that the encountered indirect jump location is associated with a high confidence level (i.e., determination block 810="Yes"), or in response to determining that the encountered indirect jump location and the identified indirect jump target do not match an associated indirect jump location and indirect jump target in the compiler guided indirect jump table (i.e., determination block 812="No"), the processing device may abort the program in block 814.

Figure 9:
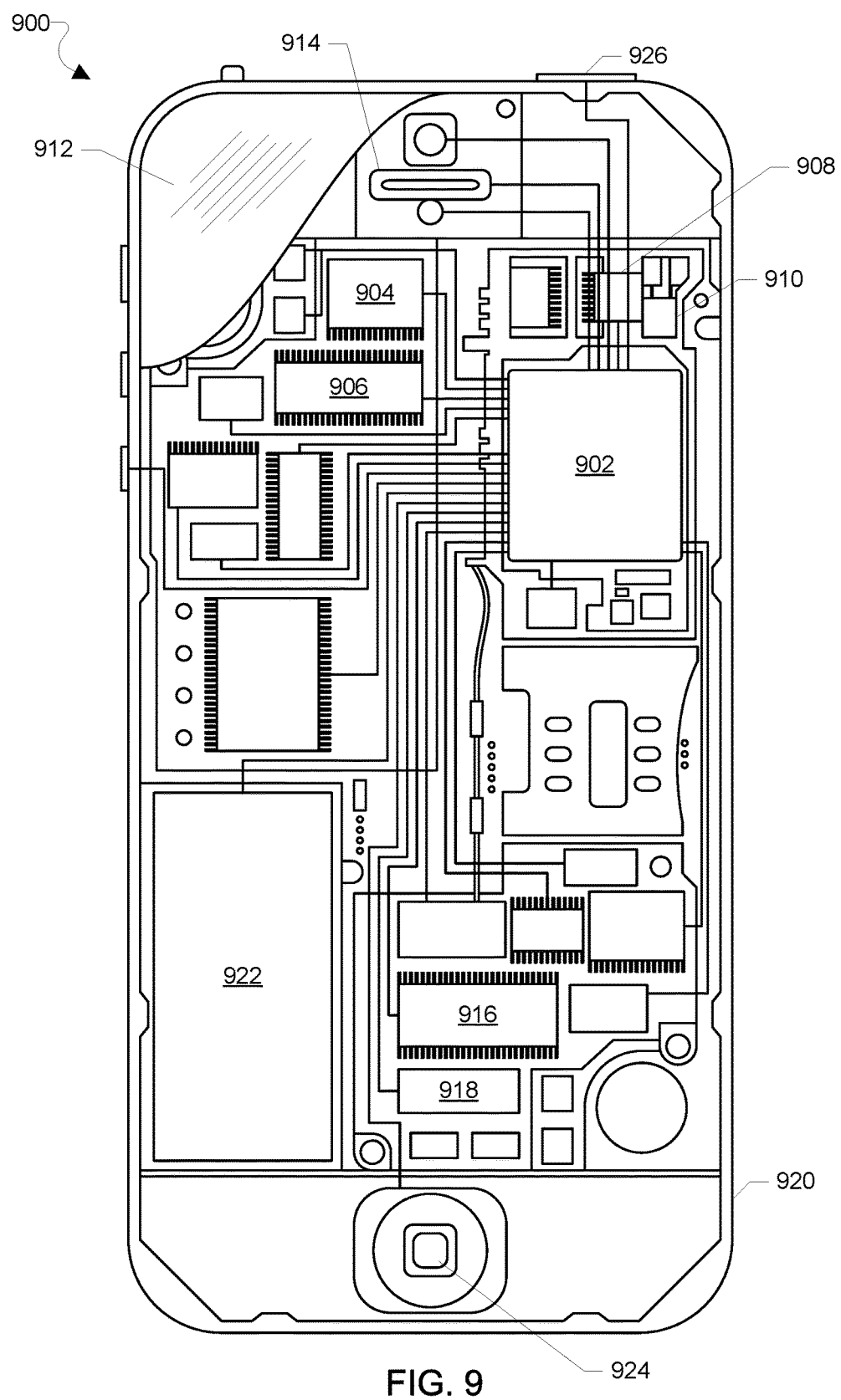
FIG. 9 is a component block diagram illustrating an example mobile computing device suitable for use with the various embodiments.

The various embodiments (including, but not limited to, embodiments described above with reference to FIGS. 1-8) may be implemented in a wide variety of computing systems including mobile computing devices, an example of which suitable for use with the various embodiments is illustrated in FIG. 9. The mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the computing device 900 need not have touch screen capability.

The mobile computing device 900 may have one or more radio signal transceivers 908 (e.g., Peanut, Bluetooth, Zigbee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as Universal Serial Bus (USB), FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components described herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
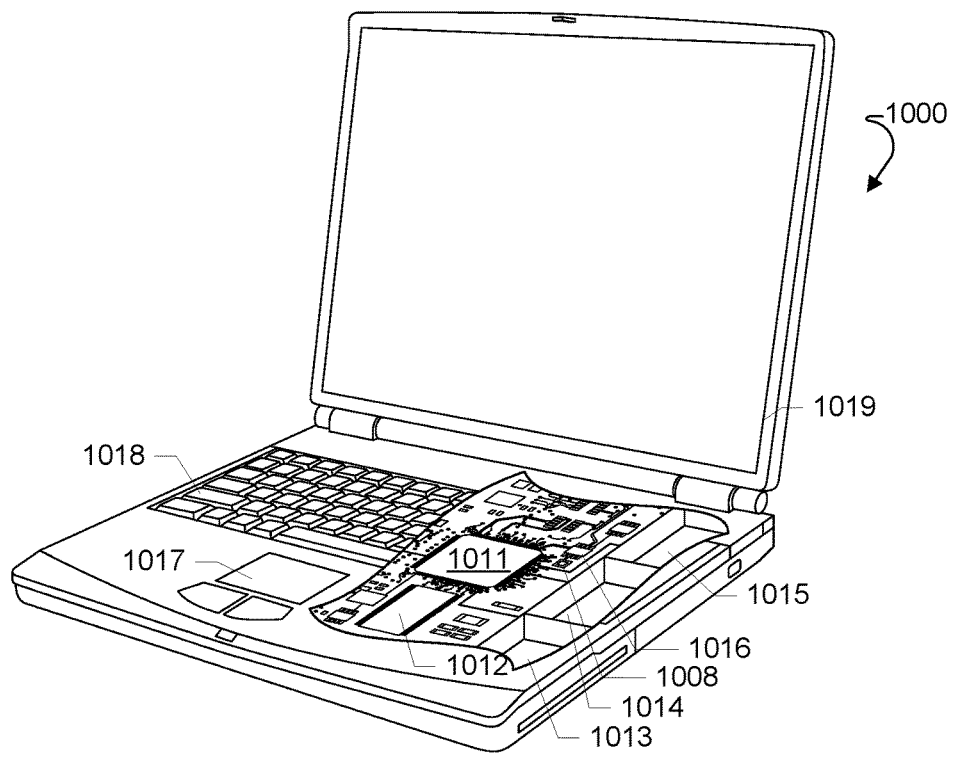
FIG. 10 is a component block diagram illustrating an example mobile computing device suitable for use with the various embodiments.

The various embodiments (including, but not limited to, embodiments described above with reference to FIGS. 1-8) may be implemented in a wide variety of computing systems include a laptop computer 1000 an example of which is illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1011 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1011. The computer 1000 may also include a floppy disc drive 1014 and a compact disc (CD) drive 1015 coupled to the processor 1011. In a notebook configuration, the computer housing includes the touchpad 1017, the keyboard 1018, and the display 1019 all coupled to the processor 1011. Other configurations of the computing device may include a computer mouse or trackball coupled to the processor (e.g., via a USB input) as are well known, which may also be used in conjunction with the various embodiments.

Figure 11:
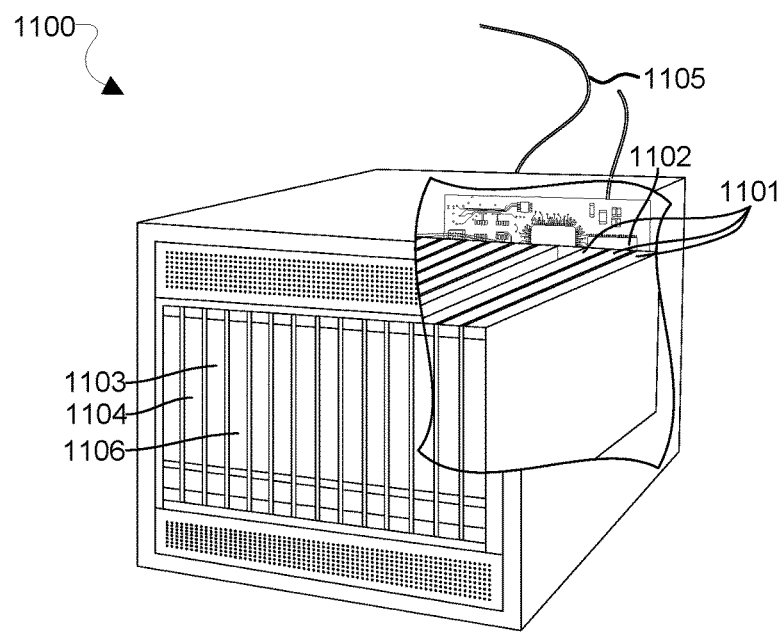
FIG. 11 is a component block diagram illustrating an example server suitable for use with the various embodiments.

The various embodiments (including, but not limited to, embodiments described above with reference to FIGS. 1-8) may also be implemented in fixed computing systems, such as any of a variety of commercially available servers. An example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, SMALLTALK®, JAVA®, JAVASCRIPT®, VISUAL BASIC®, a Structured Query Language (e.g., Transact-SQL), PERL®, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of implementing profile guided indirect jump checking on a computing device, comprising:
    identifying an indirect jump target of an indirect jump in response to encountering an indirect jump location while implementing the indirect jump during execution of a program;
    determining whether the indirect jump location and the indirect jump target are associated in a profile guided indirect jump table;
    determining whether the indirect jump location and the indirect jump target are associated in a compiler guided indirect jump table
    in response to determining that the indirect jump location and the indirect jump target are not associated in the profile guided indirect jump table; and
    aborting the program in response to determining that the indirect jump location and the indirect jump target are not associated in the compiler guided indirect jump table.

2. The method of claim 1, further comprising continuing to execute the program in response to determining that the indirect jump location and the indirect jump target are associated in the profile guided indirect jump table.

3. The method of claim 1, further comprising:
    continuing to execute the program with a warning in response to determining that the indirect jump location and the indirect jump target are associated in the compiler guided indirect jump table.

4. The method of claim 1, further comprising:
    determining whether the indirect jump location is associated with a high confidence level in response to determining that the indirect jump location and the indirect jump target are not associated in the profile guided indirect jump table; and
    aborting the program in response to determining that the indirect jump location is associated with a high confidence level.

5. The method of claim 4, wherein determining whether the indirect jump location and the indirect jump target are associated in a compiler guided indirect jump table comprises determining whether the indirect jump location and the indirect jump target are associated in the compiler guided indirect jump table in response to determining that the indirect jump location is not associated with a high confidence level,
    the method further comprising:
    continuing to execute the program with a warning in response to determining that the indirect jump location and the indirect jump target are associated in the compiler guided indirect jump table.

6. The method of claim 4, wherein determining whether the indirect jump location is associated with a high confidence level comprises retrieving a confidence level associated with the indirect jump location in the profile guided indirect jump table.

7. The method of claim 4, wherein determining whether the indirect jump location is associated with a high confidence level comprises identifying a confidence level designated for the profile guided indirect jump table.

8. The method of claim 1, wherein the profile guided indirect jump table is one of a plurality of indirect jump tables each containing less than all of the indirect jump locations for the program.

9. A computing device, comprising:
    a processing device configured to perform operations comprising:
        identifying an indirect jump target of an indirect jump in response to encountering an indirect jump location while implementing the indirect jump during execution of a program;
        determining whether the indirect jump location and the indirect jump target are associated in a profile guided indirect jump table;
        determining whether the indirect jump location and the indirect jump target are associated in a compiler guided indirect jump table
        in response to determining that the indirect jump location and the indirect jump target are not associated in the profile guided indirect jump table; and
        aborting the program in response to determining that the indirect jump location and the indirect jump target are not associated in the compiler guided indirect jump table.

10. The computing device of claim 9, wherein the processing device is configured to perform operations further comprising continuing to execute the program in response to determining that the indirect jump location and the indirect jump target are associated in the profile guided indirect jump table.

11. The computing device of claim 9, wherein the processing device is configured to perform operations further comprising:
    continuing to execute the program with a warning in response to determining that the indirect jump location and the indirect jump target are associated in the compiler guided indirect jump table.

12. The computing device of claim 9, wherein the processing device is configured to perform operations further comprising:
    determining whether the indirect jump location is associated with a high confidence level in response to determining that the indirect jump location and the indirect jump target are not associated in the profile guided indirect jump table; and aborting the program in response to determining that the indirect jump location is associated with a high confidence level.

13. The computing device of claim 12, wherein:

the processing device is device is configured to perform operations such that determining whether the indirect jump location and the indirect jump target are associated in a compiler guided indirect jump table comprises determining whether the indirect jump location and the indirect jump target are associated in the compiler guided indirect jump table in response to determining that the indirect jump location is not associated with a high confidence level;

the processing device is configured to perform operations further comprising:

continuing to execute the program with a warning in response to determining that the indirect jump location and the indirect jump target are associated in the compiler guided indirect jump table.

14. The computing device of claim 12, wherein the processing device is device is configured to perform operations such that determining whether the indirect jump location is associated with a high confidence level comprises retrieving a confidence level associated with the indirect jump location in the profile guided indirect jump table.

15. The computing device of claim 12, wherein the processing device is device is configured to perform operations such that determining whether the indirect jump location is associated with a high confidence level comprises identifying a confidence level designated for the profile guided indirect jump table.

16. The computing device of claim 9, wherein the profile guided indirect jump table is one of a plurality of indirect jump tables each containing less than all of the indirect jump locations for the program.

17. A computing device, comprising:

means for identifying an indirect jump target of an indirect jump in response to encountering an indirect jump location while implementing the indirect jump during execution of a program;

means for determining whether the indirect jump location and the indirect jump target are associated in a profile guided indirect jump table;

means for determining whether the indirect jump location and the indirect jump target are associated in a compiler guided indirect jump table in response to determining that the indirect jump location and the indirect jump target are not associated in the profile guided indirect jump table; and means for aborting the program in response to determining that the indirect jump location and the indirect jump target are not associated in the compiler guided indirect jump table.

18. The computing device of claim 17, further comprising means for continuing to execute the program in response to determining that the indirect jump location and the indirect jump target are associated in the profile guided indirect jump table.

19. The computing device of claim 17, further comprising means for continuing to execute the program with a warning in response to determining that the indirect jump location and the indirect jump target are associated in the compiler guided indirect jump table.

20. The computing device of claim 17, further comprising:

means for determining whether the indirect jump location is associated with a high confidence level in response to determining that the indirect jump location and the indirect jump target are not associated in the profile guided indirect jump table; and means for aborting the program in response to determining that the indirect jump location is associated with a high confidence level.

21. The computing device of claim 20, wherein means for determining whether the indirect jump location and the indirect jump target are associated in a compiler guided indirect jump table comprises means for determining whether the indirect jump location and the indirect jump target are associated in the compiler guided indirect jump table in response to determining that the indirect jump location is not associated with a high confidence level, the computing device further comprising:

means for continuing to execute the program with a warning in response to determining that the indirect jump location and the indirect jump target are associated in the compiler guided indirect jump table.

22. The computing device of claim 20, wherein means for determining whether the indirect jump location is associated with a high confidence level comprises means for retrieving a confidence level associated with the indirect jump location in the profile guided indirect jump table.

23. The computing device of claim 20, wherein means for determining whether the indirect jump location is associated with a high confidence level comprises means for identifying a confidence level designated for the profile guided indirect jump table.

24. A non-transitory processor-readable storage medium having stored thereon processor-executable instructions configured to cause a processor of a computing device to perform operations comprising:

identifying an indirect jump target of an indirect jump in response to encountering an indirect jump location while implementing the indirect jump during execution of a program;

determining whether the indirect jump location and the indirect jump target are associated in a profile guided indirect jump table;

determining whether the indirect jump location and the indirect jump target are associated in a compiler guided indirect jump table in response to determining that the indirect jump location and the indirect jump target are not associated in the profile guided indirect jump table; and aborting the program in response to determining that the indirect jump location and the indirect jump target are not associated in the compiler guided indirect jump table.

25. The non-transitory processor-readable storage medium of claim 24, wherein the stored processor-executable instructions are configured to cause the processor to perform operations further comprising continuing to execute the program in response to determining that the indirect jump location and the indirect jump target are associated in the profile guided indirect jump table.

26. The non-transitory processor-readable storage medium of claim 24, wherein the stored processor-executable instructions are configured to cause the processor to perform operations further comprising:

continuing to execute the program with a warning in response to determining that the indirect jump location and the indirect jump target are associated in the compiler guided indirect jump table.

27. The non-transitory processor-readable storage medium of claim 24, wherein the stored processor-executable instructions are configured to cause the processor to perform operations further comprising:
   determining whether the indirect jump location is associated with a high confidence level in response to determining that the indirect jump location and the indirect jump target are not associated in the profile guided indirect jump table; and
   aborting the program in response to determining that the indirect jump location is associated with a high confidence level.

28. The non-transitory processor-readable storage medium of claim 27, wherein:
   the stored processor-executable instructions are configured to cause the processor to perform operations such that determining whether the indirect jump location and the indirect jump target are associated in a compiler guided indirect jump table comprises:
   determining whether the indirect jump location and the indirect jump target are associated in the compiler guided indirect jump table in response to determining that the indirect jump location is not associated with a high confidence level;
   the stored processor-executable instructions are configured to cause the processor to perform operations further comprising:
   continuing to execute the program with a warning in response to determining that the indirect jump location and the indirect jump target are associated in the compiler guided indirect jump table.

29. The non-transitory processor-readable storage medium of claim 27, wherein the stored processor-executable instructions are configured to cause the processor to perform operations such that determining whether the indirect jump location is associated with a high confidence level comprises retrieving a confidence level associated with the indirect jump location in the profile guided indirect jump table.

30. The non-transitory processor-readable storage medium of claim 27, wherein the stored processor-executable instructions are configured to cause the processor to perform operations such that determining whether the indirect jump location is associated with a high confidence level comprises identifying a confidence level designated for the profile guided indirect jump table.

* * * * *